(12) United States Patent
Chapman et al.

(10) Patent No.: US 12,071,979 B2
(45) Date of Patent: Aug. 27, 2024

(54) BEARING ASSEMBLY FOR TUFTING MACHINE CUTTING ATTACHMENT

(71) Applicant: COLUMBIA INSURANCE COMPANY, Omaha, NE (US)

(72) Inventors: Roy Chapman, Adairsville, GA (US); David Voyles, Cleveland, TN (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 18/330,883

(22) Filed: Jun. 7, 2023

(65) Prior Publication Data

US 2023/0392645 A1 Dec. 7, 2023

Related U.S. Application Data

(63) Continuation of application No. 17/317,060, filed on May 11, 2021, now Pat. No. 11,674,549.

(60) Provisional application No. 63/022,803, filed on May 11, 2020.

(51) Int. Cl.
*F16C 33/10* (2006.01)
*D05C 15/08* (2006.01)
*F16C 33/04* (2006.01)

(52) U.S. Cl.
CPC ............ *F16C 33/106* (2013.01); *D05C 15/08* (2013.01); *F16C 33/046* (2013.01)

(58) Field of Classification Search
CPC ...... F16C 17/02; F16C 17/022; F16C 17/026; F16C 33/046; F16C 33/106; F16C 33/1065; F16C 33/107; F16C 33/1075; F16C 35/02; F16C 2340/00; D05C 15/08; D05C 15/20; D05C 15/22; D05C 15/24
See application file for complete search history.

(56) References Cited

U.S. PATENT DOCUMENTS

| | | | | |
|---|---|---|---|---|
| 288,489 | A * | 11/1883 | Proctor | F16C 33/12 384/276 |
| 3,276,828 | A * | 10/1966 | Mansfield | F16C 35/063 384/585 |
| 4,693,191 | A * | 9/1987 | Card | D05C 15/24 112/80.6 |
| 6,648,514 | B2 * | 11/2003 | Cevasco | F16D 1/0864 384/537 |

* cited by examiner

*Primary Examiner* — James Pilkington
(74) *Attorney, Agent, or Firm* — Ballard Spahr LLP

(57) ABSTRACT

A shaft assembly has a shaft and a journal bearing that is fixedly coupled to the shaft so that rotation of the shaft causes corresponding rotation of the journal bearing. A bearing race has an inner surface that defines a cylindrical bore and a lubrication groove that extends radially outward from the cylindrical bore. The journal bearing is rotatably disposed within the cylindrical bore of the bearing race.

20 Claims, 14 Drawing Sheets

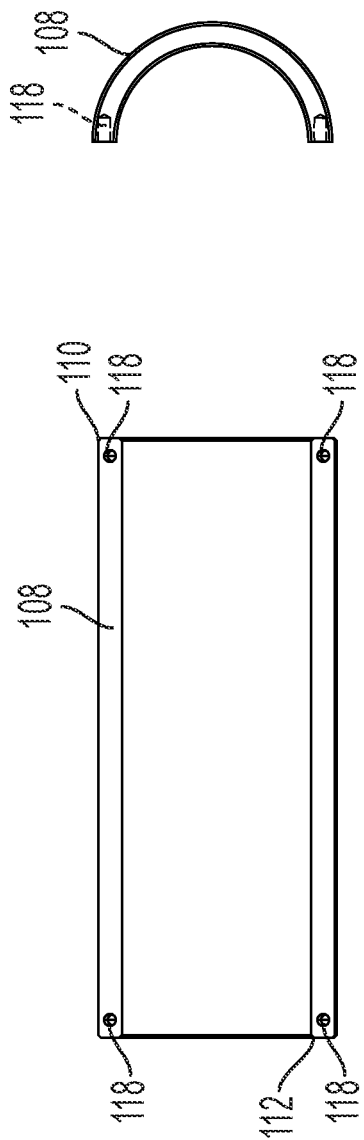
FIG. 3A
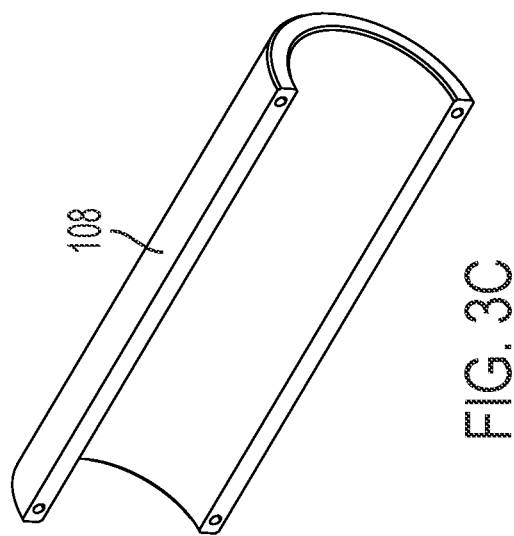
FIG. 3B
FIG. 3C

BEARING ASSEMBLY FOR TUFTING MACHINE CUTTING ATTACHMENT

CROSS-REFERENCE TO RELATED APPLICATION

This application is a continuation of U.S. patent application Ser. No. 17/317,060, filed May 11, 2021, which claims priority to, and the benefit of the filing date of, U.S. Provisional Patent Application No. 63/022,803, filed May 11, 2020, the entirety of each of which is hereby incorporated by reference herein.

FIELD

This application relates generally to apparatuses and systems for facilitating pivotal motion and, more particularly, to apparatuses and systems for facilitating pivotal motion of a tufting machine cutting attachment.

BACKGROUND

Tufting machines often comprise cutting attachments for cutting looped yarn to form cut tufts. The cutting attachment can include a knife bar bracket supporting a knife bar. The knife bar can hold a plurality of knives that are moved into contact with yarn loops to cut the yarn loops as they are formed. Various aspects of exemplary tufting machines and cutting attachments are disclosed in U.S. Pat. No. 4,693,191, issued Sep. 15, 1987, the entirety of which is hereby incorporated by reference herein.

Conventional cutting attachments for tufting machines have shafts that are rotatably supported on roller bearings. However, because of the reciprocal, oscillating movement of the shafts, the roller bearings are subject to wear, and the cutting attachments rapidly develop looseness, thereby leading to reduced precision and performance. Moreover, said bearings are difficult to replace, requiring operators to substantially dismantle the cutting tufting machine in order to access the bearings.

SUMMARY

Described herein, in various aspects, is a shaft assembly comprising a shaft. A journal bearing can be fixedly coupled to the shaft so that rotation of the shaft causes corresponding rotation of the journal bearing. A bearing race can have an inner surface that defines a cylindrical bore and a lubrication groove that extends radially outward from the cylindrical bore. The journal bearing can be rotatably disposed within the cylindrical bore of the bearing race.

A tufting apparatus can comprise a cutting assembly comprising at least one shaft. A frame can support and receive therethrough each shaft of the at least one shaft. The cutting assembly can further comprise at least one bearing assembly, each bearing assembly being disposed between the frame and a respective shaft of the at least one shaft. Each respective bearing assembly can comprise a journal bearing that is fixedly coupled to the respective shaft so that rotation of the shaft causes corresponding rotation of the journal bearing. A bearing race can have an inner surface that defines a cylindrical bore and a lubrication groove that extends radially outward from the cylindrical bore. The journal bearing can be rotatably disposed within the cylindrical bore of the bearing race.

A bearing assembly can comprise a journal bearing that is configured to be fixedly coupled to a shaft so that rotation of the shaft causes corresponding rotation of the journal bearing and a bearing race having an inner surface that defines a cylindrical bore and a lubrication groove that extends radially outward from the cylindrical bore. The journal bearing can be rotatably disposed within the cylindrical bore of the bearing race.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

These and other features of the preferred embodiments of the invention will become more apparent in the detailed description in which reference is made to the appended drawings wherein:

FIG. 3A is a side view of a portion of a split bearing. FIG. 3B is an end view of the portion of the split bearing as in FIG. 3A. FIG. 3C is a perspective view of the portion of the split bearing as in FIG. 3A.

Figure 1:
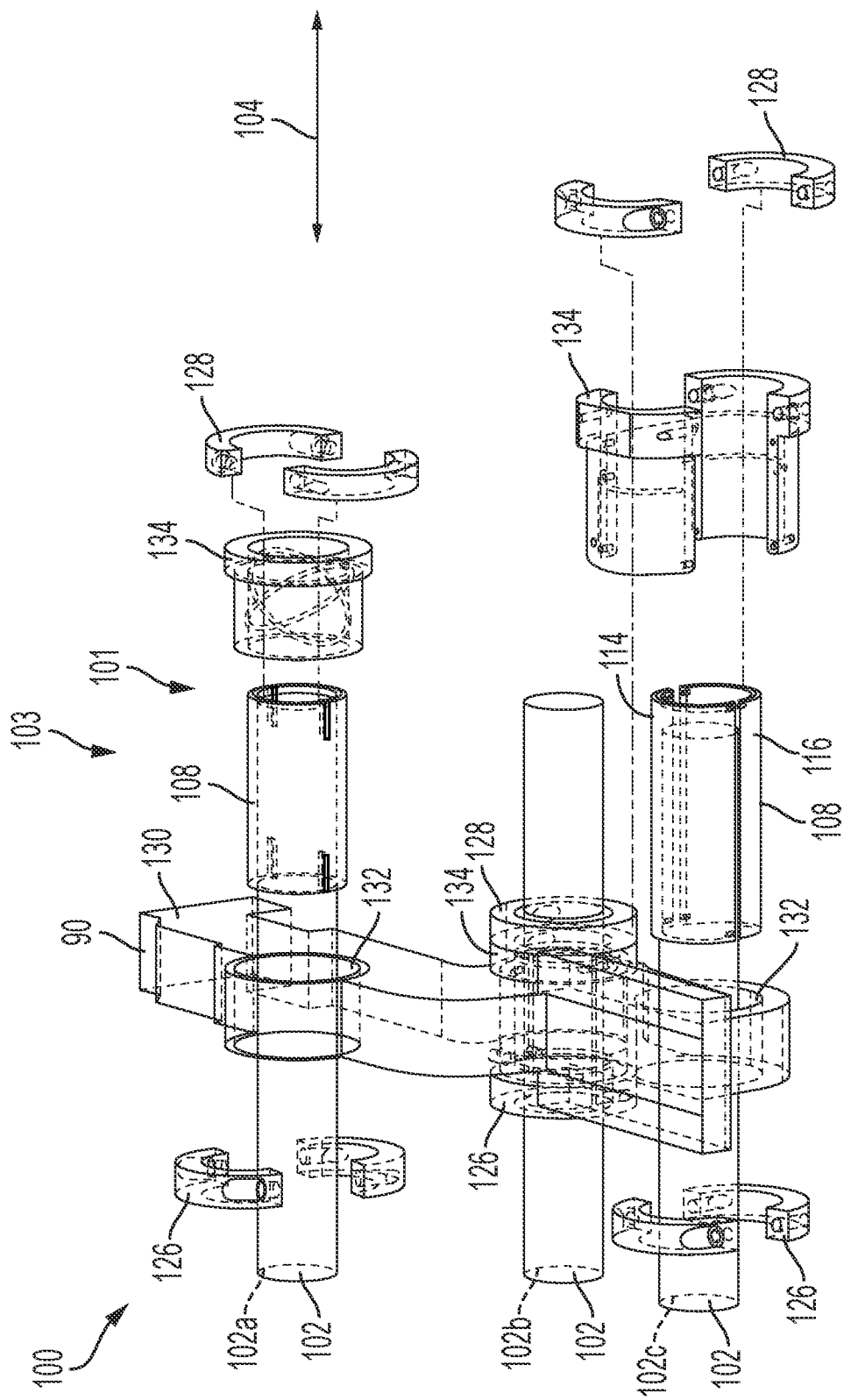
FIG. 1 illustrates an exploded view of a portion of a cutting attachment assembly in accordance with embodiments disclosed herein.

The dimensions provided in the Figures, which are provided in inches unless otherwise indicated, should be understood to be optional dimensions, and other dimensions are contemplated.

DETAILED DESCRIPTION

The disclosed system and method may be understood more readily by reference to the following detailed description of particular embodiments and the examples included therein and to the Figures and their previous and following description.

It is to be understood that the terminology used herein is for the purpose of describing particular embodiments only and is not intended to limit the scope of the present invention which will be limited only by the appended claims.

It must be noted that as used herein and in the appended claims, the singular forms "a", "an," and "the" include plural references unless the context clearly dictates otherwise. Thus, for example, reference to "a bearing" includes one or more of such bearings, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values are approximated by use of the antecedents "about," "substantially," or "generally," it is contemplated that values within up to 15%, up to 10%, up to 5%, or up to 1% (above or below) of the particularly stated value or characteristic can be included within the scope of those aspects.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

Disclosed herein are bearing assemblies that provide for improved precision and performance of tufting machines that include cutting attachments. In use, the bearing assemblies can reduce or prevent the development of looseness in the cutting attachment, thereby maximizing bearing life and providing increased cutting speed and quality. As one skilled in the art can appreciate, wear of conventional roller bearings can diminish the accuracy and precision of the tufting machine, requiring the machine to be slowed or temporarily shut down for rebuilding. Additionally, the structure of the disclosed bearing assemblies can permit rebuilding or replacement of existing bearing assemblies of the cutting attachment without the need for removing the shafts of the cutting attachment. This capability can lower the cost and time associated with rebuilding cutting attachments while also decreasing the frequency at which such cutting attachments must be replaced.

Referring to FIG. 1, a tufting apparatus 90 can comprise a cutting assembly 100 (e.g., a cutting attachment). The cutting assembly 100 can comprise a plurality of shafts 102 (e.g., a first shaft 102a, a second shaft 102b, and a third shaft 102c) that extend in a longitudinal dimension 104. In some aspects, the first shaft 102a can be a common pivot shaft, the second shaft 102b can be a knife drive shaft (for driving a knife or knife bar), and the third shaft 102c can be a looper drive shaft (for driving a looper apparatus as is known in the art). Each of the shafts 102 can be coupled to a respective journal bearing 108 (two shown).

Referring to FIGS. 1 and 3A-3C, in some aspects, the journal bearing 108 can be fixedly coupled to the shaft 102 so that rotation of the shaft causes corresponding rotation of the journal bearing 108. For example, the journal bearing 108 can have opposing first and second ends 110, 112 that are spaced by a length. In some aspects, the journal bearing 108 can be a split bearing that is split along its axis into a first portion 114 and a second portion 116 that define opposing sides of the bearing. Each of the first and second portions 114 can optionally be hollow, half-cylindrical bodies with half-cylindrical inner surfaces. The first and second portions 114, 116 can meet at axially extending end surfaces. Optionally, the first and second portions 114, 116 can be identical. Each axially extending end surface of each of the first and second portions 114, 116 can define one or more transversely extending bores 118 that can receive respective ends of press-fit dowel pins 120. The dowel pins 120 can, therefore, extend between and couple the first portion 114 and the second portion 116.

Alternatively, in further aspects and as shown in FIGS. 1 and 4A-4C, the first collar can define at least one longitudinally extending notch 122 that extends from the first end 110 of the bearing and along a portion of the length of the bearing. At least one second longitudinally extending notch 124 can extend from the second end 112 of the bearing along a portion of the length of the bearing.

Although the cutting assembly 100 is shown as having a combination of both split bearings and notched bearings, it is contemplated that some or all of the bearings 102 can be either split or notched. It is contemplated that the split bearing can enable easy bearing replacement, as the bearing does not have to be slid over an end of the shaft. It is further contemplated that the notched bearing can be cheaper and easier to manufacture and require no assembly. Thus, in various optional aspects, notched bearings can be preferable in applications in which the bearing is rarely or never changed, whereas the split bearings can be used in applications in which the bearing is frequently changed. Accordingly, although the embodiment in FIG. 1 uses both split and notched bearings, it is contemplated that the type can be interchanged based on design preference or determination of high/low wear.

In optional aspects, the bearings described herein can comprise bronze and/or steel. Likewise, optionally, the bearing races and housings can comprise steel or bronze.

A first collar 126 (e.g., a split collar) can be tightened down against an exterior surface of the journal bearing 108 at the first end 110, and a second collar 128 can be tightened down against the exterior surface of the journal bearing 108 at the second end 112. In this way, the first and second collars 126, 128 can apply a compressive force to fixedly couple the shaft to the journal bearing. That is, the interior surfaces of the journal bearing can frictionally engage the exterior surface of the first shaft 102. For example, it is contemplated that the journal bearing 108 having one or more notches 122, 124 at each end can have an inner diameter that is sufficient to slidably receive the shaft 102 therethrough, but when the exterior of the journal bearing at the notches is under compression (e.g., from the collars 126, 128), the notches can enable the ends of the bearing to flex to frictionally engage the shaft to inhibit rotational movement between the bearing and the shaft.

Referring to FIGS. 1 and 5A-5C, the journal bearings 108 can be received within respective bearing races 134. Accordingly, each journal bearing 108 and bearing race 134 can cooperate to define a bearing assembly 101. A shaft assembly 103 can comprise at least one bearing assembly 101 and a shaft 102. Each bearing race 134 can define a bore (e.g., a cylindrical bore 136) that is configured to rotatably receive the outer surface of the respective journal bearing. An inner surface 137 of the bearing race can further define one or more lubrication grooves 138 that extend radially outwardly from the bore. The lubrication grooves 138 can optionally extend around an entire circumference of the inner surface of the bearing race 134 and axially along at least part of the bearing race. Optionally, and as shown, the bearing race 134 can define two lubrication grooves 138 that intersect to provide fluid communication between the grooves and permit distribution of lubrication along each groove. In some aspects, lubricant can be provided to the lubrication grooves via a radially extending path that extends from the outer surface of the bearing race to the lubrication grooves on its inner surface. In some optional aspects, the radially extending path can provide lubricant to the intersection between the lubricant grooves.

Figure 6B:
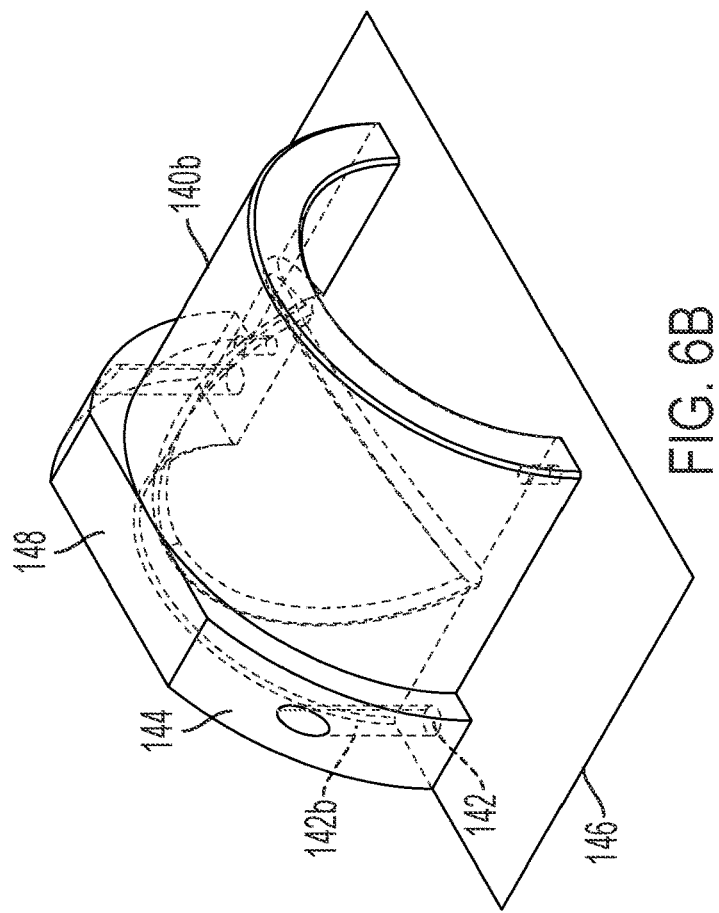
FIG. 6B is a perspective view of a second portion of the split bearing race.
Figure 6A:
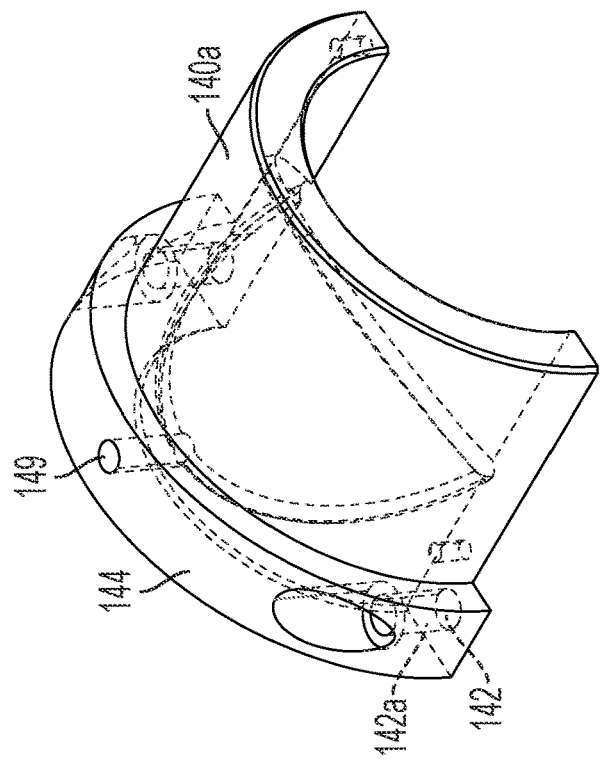
FIG. 6A is a perspective view of a first portion of a split bearing race.
Figure 7A:
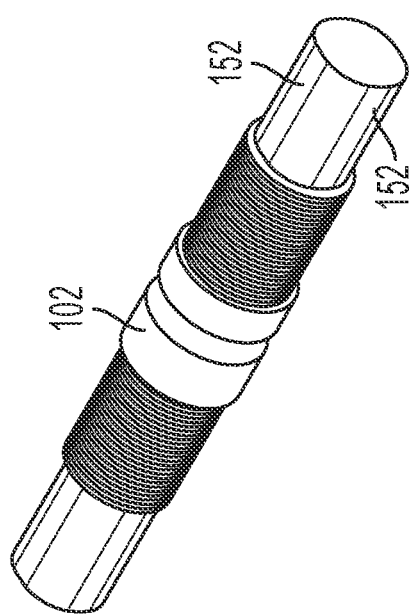
FIG. 7A is a perspective view of a shaft as disclosed herein.
Figure 7B:
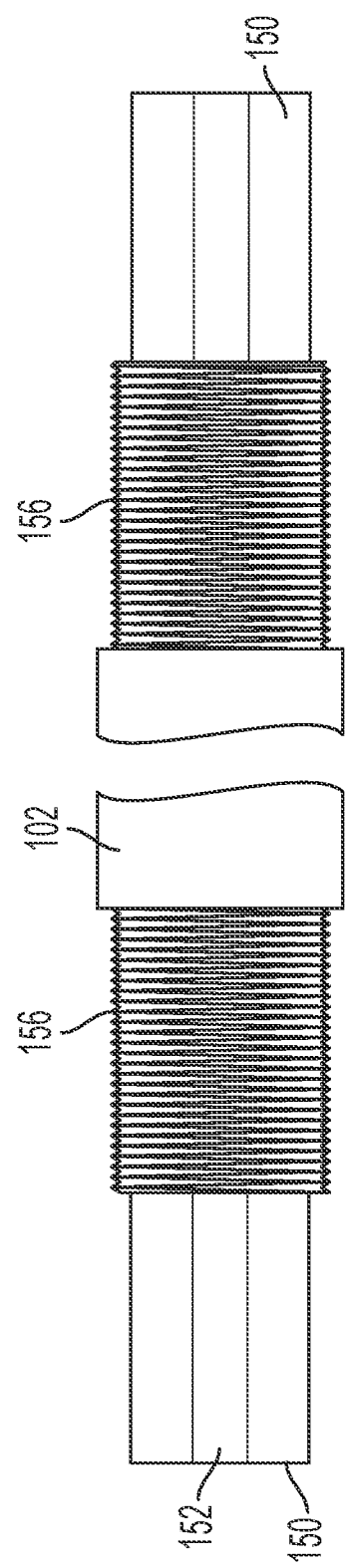
FIG. 7B is a side view of the shaft as in FIG. 7A.

Referring to FIGS. 1 and 6A-6B, one or more of the bearing races 134 can be a split bearing race that is divided along a longitudinally extending plane 146 that includes the axis of the bearing race 134, with a first portion 140a and a second portion 140b positioned on opposite sides of the plane. The first portion 140a of the bearing race 134 can meet the second portion 140b on opposing transverse sides of the shaft and bearing to cooperatively define the bore (e.g., the cylindrical bore 136). The first and second portions 140a,140b of the bearing race 134 define corresponding transversely extending bores 142 that can receive respective fasteners, (e.g., screws). Optionally, one of the transversely extending bores 142a can define a through hole, and the other corresponding transversely extending bore 142b can define threads. In some aspects, the bearing races can define a radially extending flange 144 on one end. The radially extending flange 144 can define a stop surface 145 that biases against the frame 130 to fix the axial position of the bearing race along the length of the shaft (relative to the frame 130). In some aspects, at least a portion of the radially extending flange can define a planar surface 148 (e.g., a flat) that can accommodate or engage a portion of the tufting machine frame. Optionally, the side of the flange opposite the planar surface can define the radially extending lubrication path 149. It is contemplated that the location of the planar surface opposite a lubrication fitting can provide an optimal location for service and maintenance. For example, lubrication fitting can be on a side of the bearing race that is opposite, and, therefore, spaced from the tufting machine frame. This can allow space to access the lubrication fitting and as well as for the lubrication fitting itself. Optionally, in exemplary aspects, it is contemplated that the planar surface on the radially extending flange of the bearing race need only be provided on bearing races that are used with a looper drive shaft. Thus, in these aspects, it is contemplated that the bearing races used with other shafts (e.g., a pivot shaft or knife drive shaft) can be provided without such a planar surface (e.g., flat).

The tufting apparatus can comprise a frame 130 that supports the first, second, and third shafts. The frame 130 can define receiving spaces (optionally, cylindrical bores 132) that receive respective bearing races 134.

Figure 2:
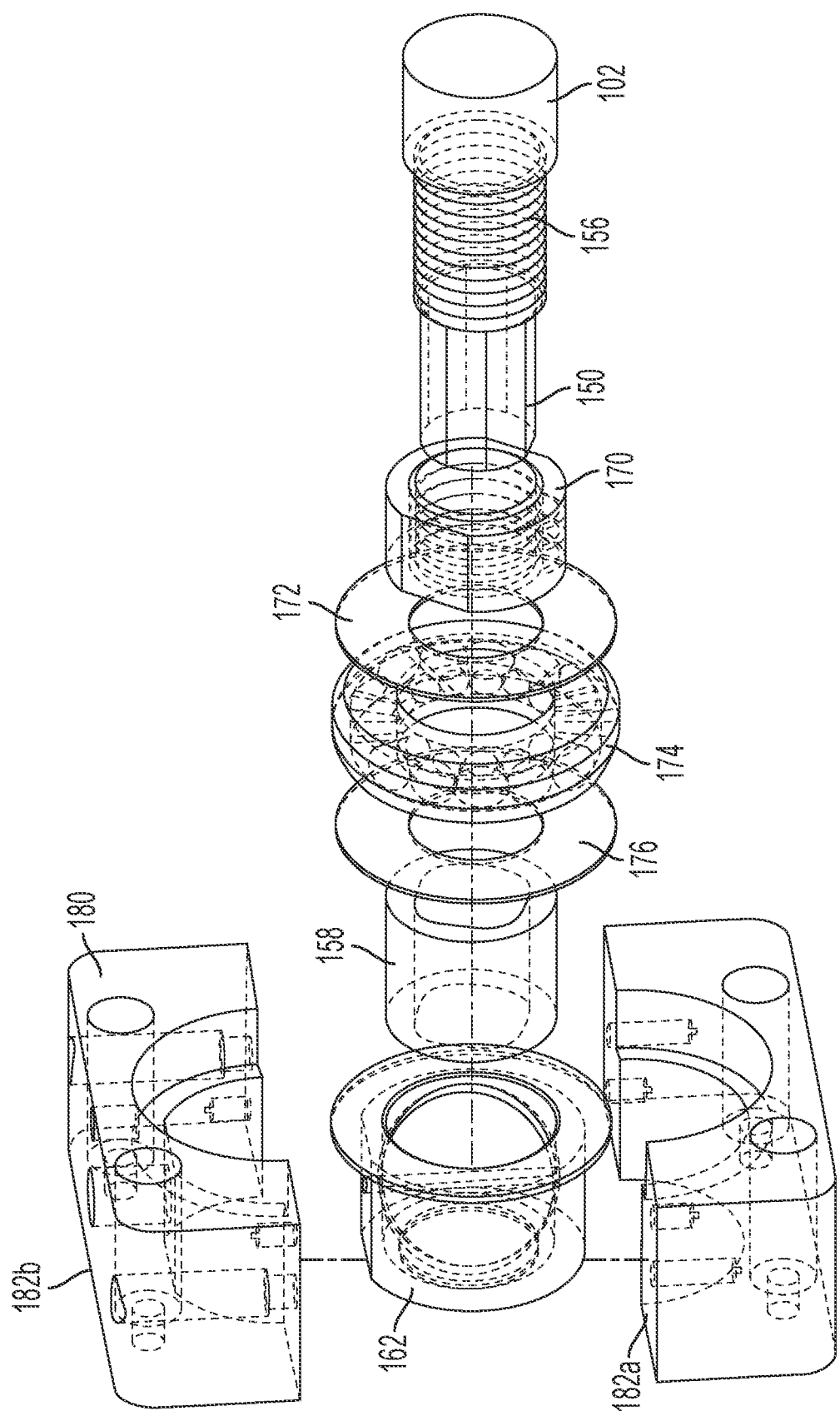
FIG. 2 is an exploded view of an end portion of the cutting attachment assembly as in FIG. 1.
Figure 4C:
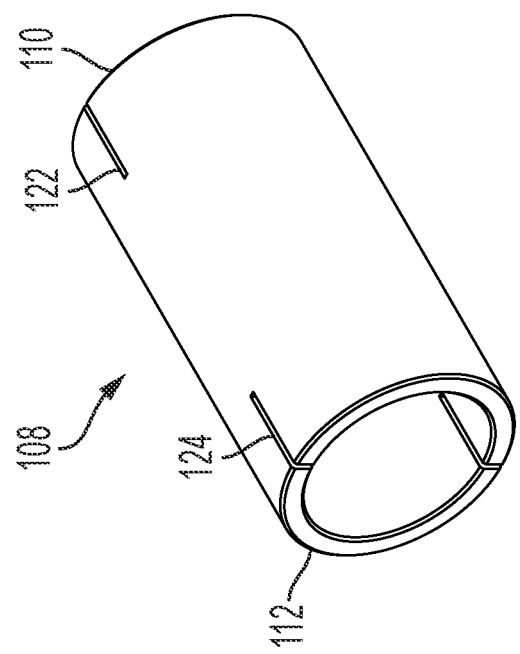
FIG. 4C is a perspective view of the notched bearing of FIG. 4A.
Figure 4B:
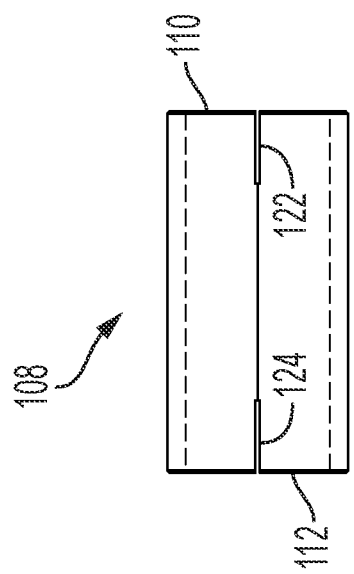
FIG. 4B is a side view of the notched bearing of FIG. 4A.
Figure 4A:
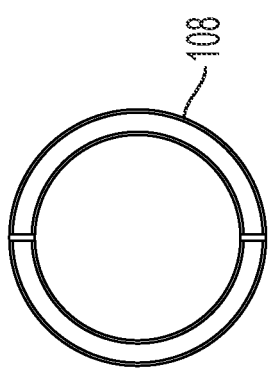
FIG. 4A is an end view of a notched bearing as disclosed herein.
Figure 5C:
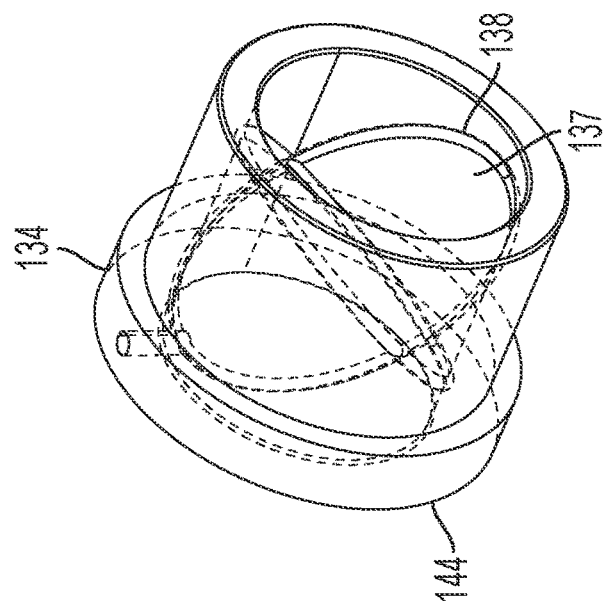
FIG. 5C is a perspective view of the bearing race of FIG. 5A.
Figure 5B:
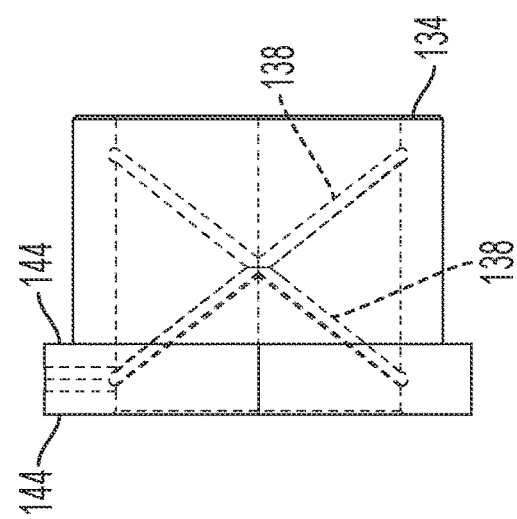
FIG. 5B is a side view of the bearing race of FIG. 5A.
Figure 5A:
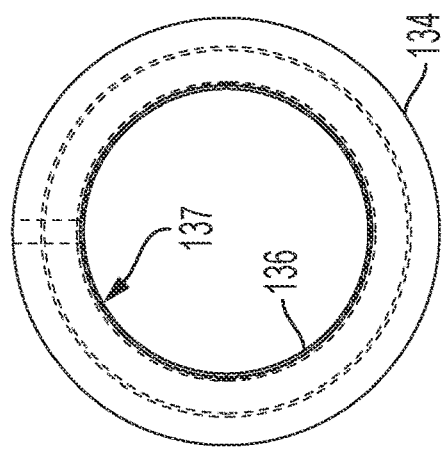
FIG. 5A is an end view of a bearing race as disclosed herein.

Referring to FIG. 2, the ends 150 of at least one (or, optionally, all) of the shafts (e.g., first, second, and third shafts 102, 104, 106) can define at least one planar surface 152 that is planar in the longitudinal dimension. For example, the at least one planar surface 152 can comprise two pairs of opposing planar surfaces 152 so that the ends 150 have generally square ends with rounded edges. Inwardly of the planar surfaces (i.e., towards the middle of the shaft), the shaft can define a plurality of external threads 156.

Figure 8A:
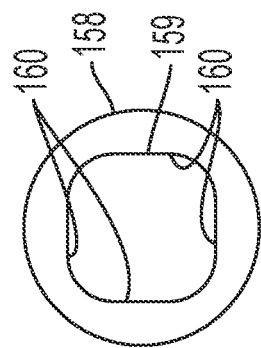
FIG. 8A is an end view of an end bearing.
Figure 8B:
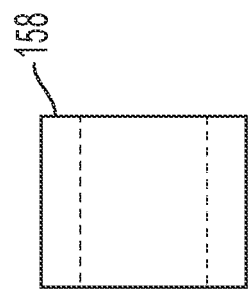
FIG. 8B is a side view of the end bearing of FIG. 8B.
Figure 9C:
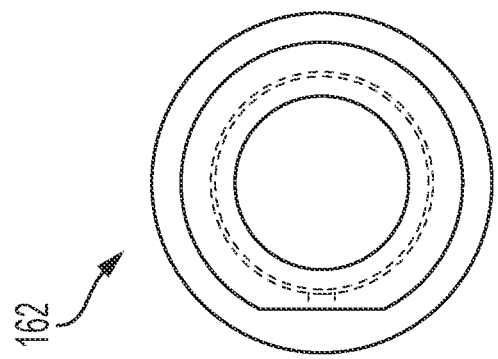
FIG. 9C is a second end view of the bearing race of FIG. 9A.
Figure 9B:
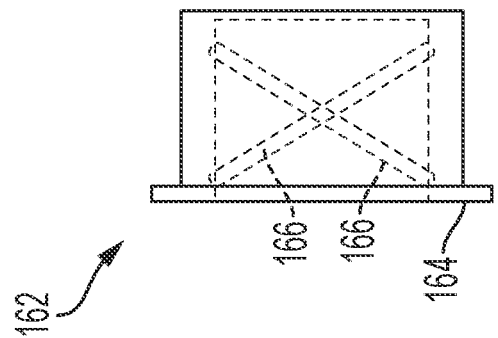
FIG. 9B is a side view of the bearing race of FIG. 9A.
Figure 9A:
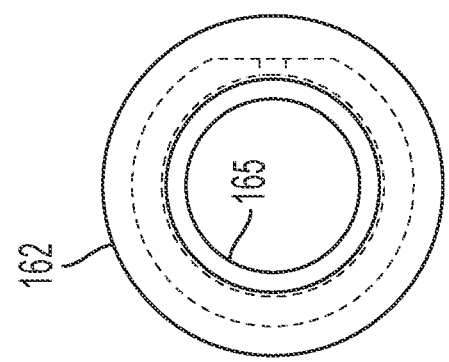
FIG. 9A is a first end view of another bearing race as disclosed herein.
Figure 10A:
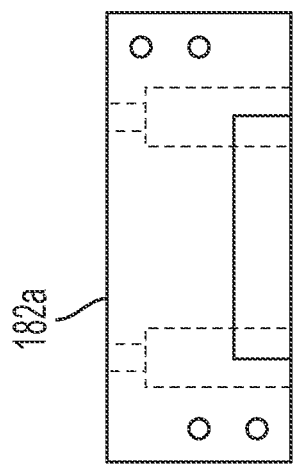
FIG. 10A is a bottom view of a first portion of a split bearing race housing as disclosed herein.
Figure 10B:
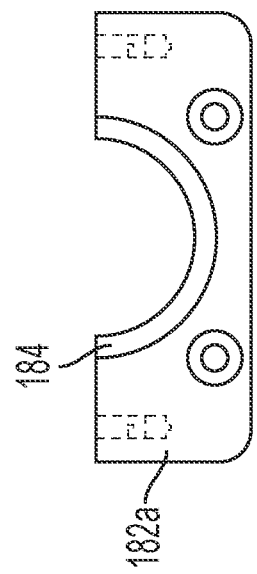
FIG. 10B is an end view of the first portion of the split bearing race of FIG. 10A.
Figure 10C:
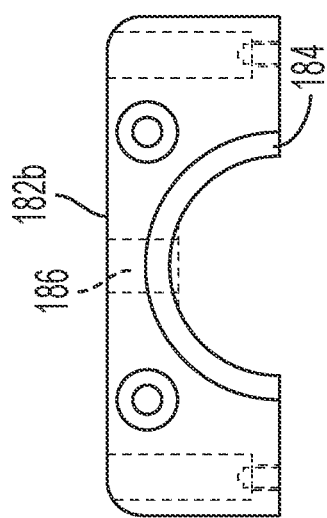
FIG. 10C is an end view of a second portion of the split bearing race.
Figure 10D:
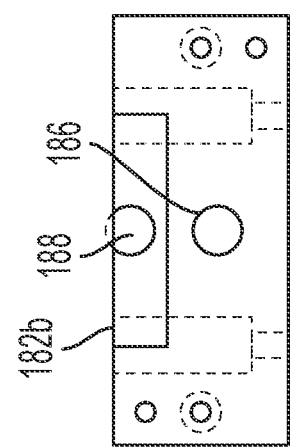
FIG. 10D is a top view of the second portion of the split bearing race of FIG. 10C.

Referring to FIGS. 2 and 8A-8B, a respective end bearing 158 can define an inner bore 159 having a cross section that matches (i.e., is complementary to) the cross section of the outer surface of the end of the shaft. That is, each end bearing 158 can define a corresponding planar surface 160 (or planar surfaces 160) to engage the respective end of the shaft. For example, as shown, the end bearing can define a generally square bore with rounded edges. The inner bore 159 of the end bearing 158 can optionally be sized to press-fit onto the end of the shaft 102.

Referring to FIGS. 2 and 9A-9C, the end bearings 158 can be received within a respective bearing race 162. Each bearing race 162 can optionally comprise a radially extending flange 164. An inner surface 165 of each bearing race 162 can further define a lubrication groove 166 that can provide a path through which lubricant can travel.

The lubrication grooves 166 can extend radially outwardly from the bore (optionally, cylindrical bore) that receives the end bearing 158. The lubrication grooves 166 can optionally extend around an entire circumference of the inner surface of the bearing race 162 and axially along at least a portion of the bearing race. Optionally, and as shown, each bearing race 162 can define two lubrication grooves 166 that intersect to provide fluid communication between the grooves and permit distribution of lubricant along each groove. In some aspects, lubricant can be provided to the lubrication grooves via a radially extending path that extends from the outer surface of the bearing race to the lubrication grooves on its inner surface. In some optional aspects, the radially extending path can provide lubricant to the intersection between the lubricant grooves. Optionally, in these aspects, it is contemplated that a lubrication fitting can be in alignment and fluid communication with the radially extending path and the intersection of the lubrication grooves 166.

Referring to FIGS. 2 and 10A-10D, each bearing race can be received within a respective bearing race housing 180. Each bearing race housing can optionally be a split bearing housing comprising a first portion 182a and a second portion 182b. In some aspects, the bearing race housing 180 can define a bore 186 for communicating lubricant to the outer surface of the bearing race at the radially extending pathway.

A threaded locking collar 170 can be threaded onto each end of the shaft 102. A first spacer 172 can then be received onto the end of the shaft, followed, in turn, by a thrust bearing 174 and a second spacer 176. The end bearing 158 can then be inserted onto the end of the shaft. The end bearing 148 can be received within the respective bearing race 162.

On each end of the shaft, the threaded locking collars 170 can be rotated to move the locking collars toward their respective ends of the shaft. In doing so, the threaded collar biases against the first spacer 172 that, in turn, biases against the thrust bearing 174, that biases against the second spacer 176 that biases against the bearing race housing 180. The bearing race housing 180 can define a receptacle 184 (optionally a cylindrical receptacle) that can receive at least a portion of the thrust bearing 174. Accordingly, the shaft can be biasing against opposing thrust bearings 174 that engage respective bearing race housings 180. In this way, the position of the shaft can be fixed in the longitudinal dimension, thereby avoiding the oscillating movements that can cause wear and looseness in conventional cutting attachments. The bearing race housing 180 can further define a bore 188 for communicating lubricant to the thrust bearing 174.

For example, referring to FIG. 1, collars 126 and 128 can be loosened and removed from the bearing 108. In doing so, the bearing race 134 can be slid from the bore 132 of the frame 130. Further, the bearing 108 can be slid along the length of the shaft 102 and removed from one end of the shaft. A replacement bearing can be slid over the end of the shaft and along the shaft, and the same or a replacement bearing housing 104 can be slid along the shaft and into the bore 132 with the bearing therein. The collars 126, 128 can be tightened down against the bearing 108 with the flange of the bearing race against the housing to fix the bearing and the bearing race in axial position. In further aspects, it is contemplated that the split designs of the collar(s), the journal bearing(s), and the bearing race(s) can permit replacement of said components without the need for removing the shafts of the cutting assembly (to slide the components off the end of the shaft, as described above). More particularly, because such bearing components can be separated (split), the bearing components can easily be removed from the shafts and/or positioned over the shafts without the need for removing the shafts from the cutting assembly and/or advancing the bearing components along a significant portion of the length of the shaft, starting from a longitudinal end of the shaft. This capability makes the modification and/or replacement of bearing components far more efficient and less costly.

When combined with the reduced wear and improved shaft stability provided by the disclosed bearing structures, the disclosed bearing assemblies can offer greatly improved life and performance.

Figure 11:
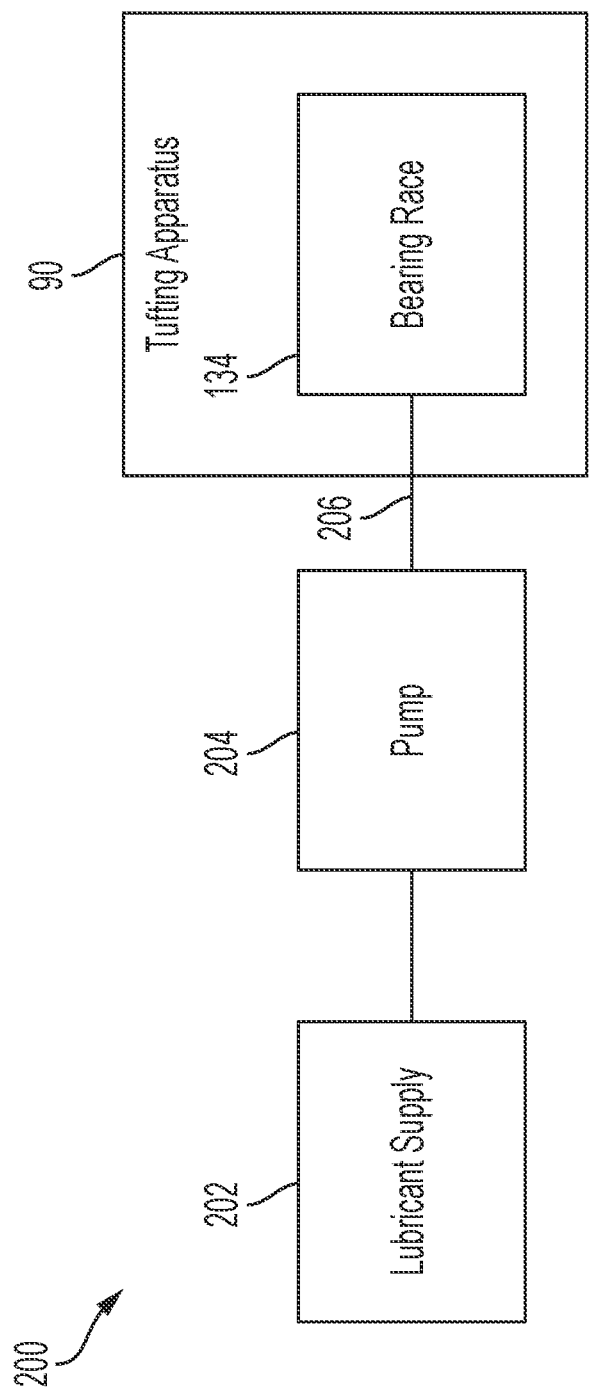
FIG. 11 is a block diagram showing a lubrication assembly.

Referring to FIG. 11, one or more lubrication assembles 200 can be in communication with each of the bearing races to provide lubricant thereto. Optionally, the lubrication assembly 200 can comprise a lubricant supply 202, a pump 204, and a conduit 206 for delivering the lubricant to the bearing races 134 of the tufting assembly 90.

Although the collars 126, 128 are shown as split collars, in further optional aspects, the collars can be clamp collars or another suitable device that applies a compressive force to the journal bearing 108. In various further optional aspects, in lieu of, or in addition to a collar, the shaft 102 can fixedly couple to the journal bearing 108 via a key, spline or other interlocking feature.

Although various references to cylindrical bores and cylindrical surfaces are described herein, it is contemplated that further embodiments use other rotationally complementary surfaces, such as frustoconical surfaces or interlocking axially spaced radial ribs. For example, the bearing 108 can define a frustoconical outer surface, and the bearing race 134 can define a frustoconical inner surface that is configured to receive the frustoconical outer surface of the journal bearing 108. Said frustoconical surfaces can optionally cooperate to receive radial and axial forces. Accordingly, in some optional aspects, the frustoconical surfaces can enable the journal bearing to serve as a thrust bearing.

Figure 12:
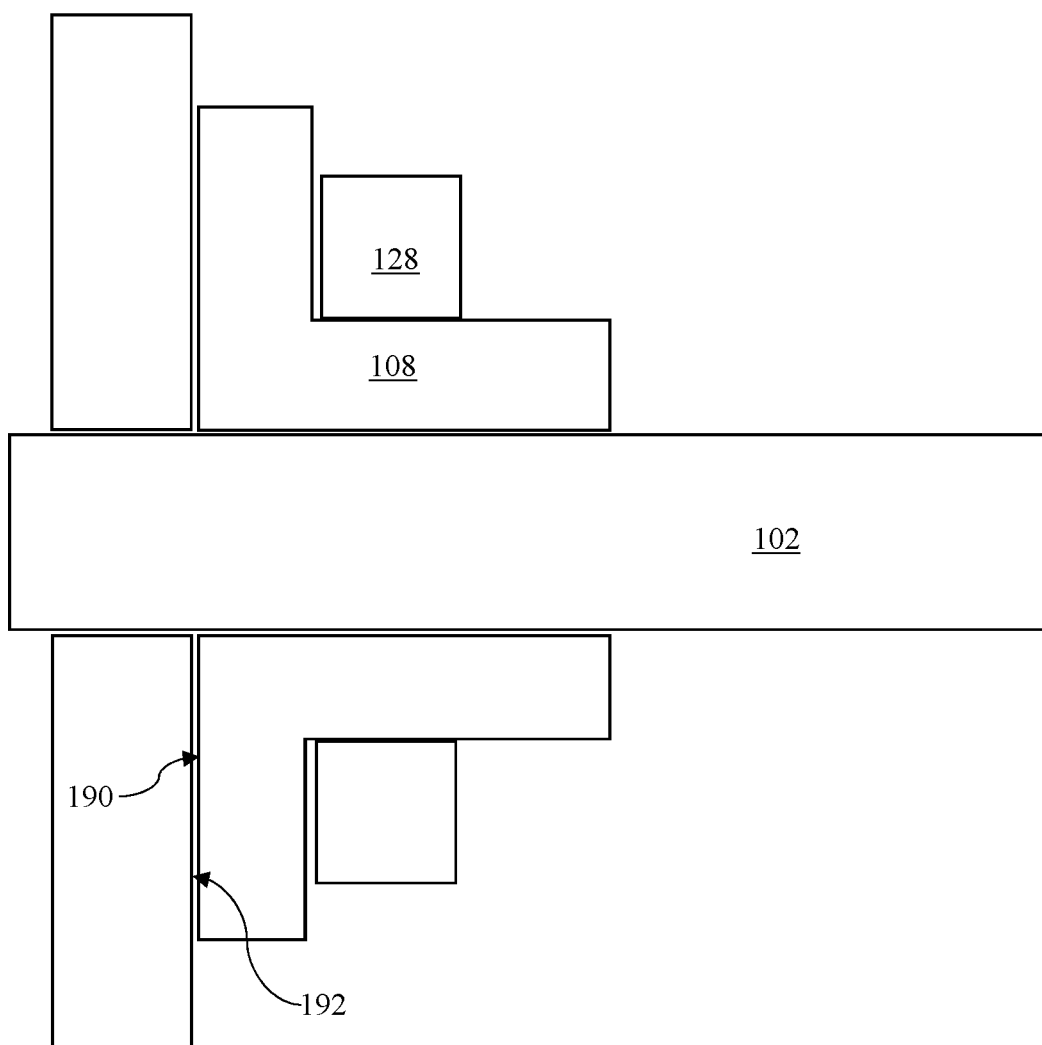
FIG. 12 is a schematic cross section of a thrust bearing assembly.
Figure 13:
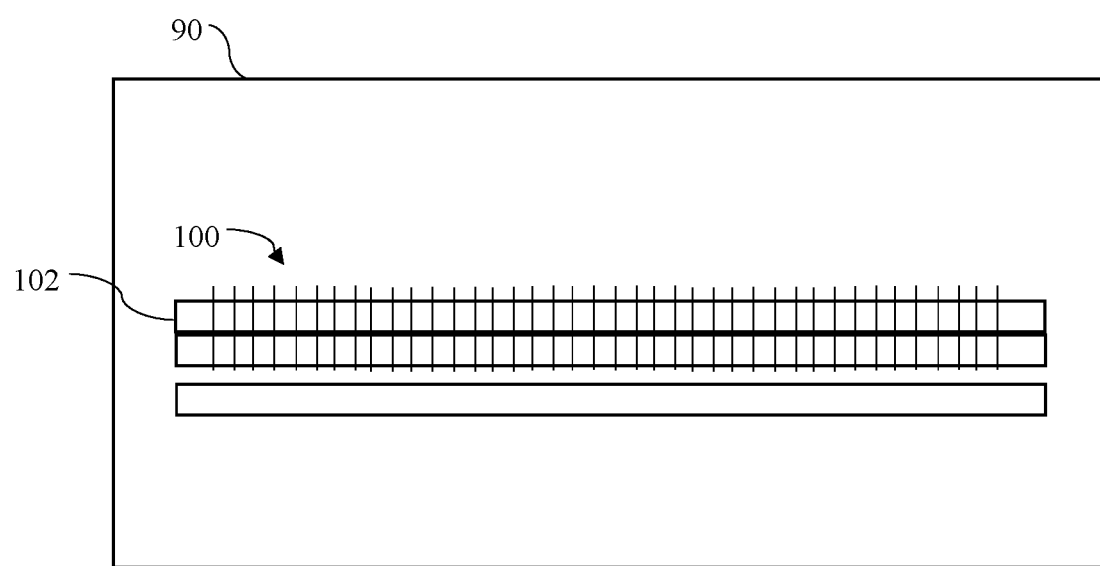
FIG. 13 shows a schematic depiction of a tufting machine having a cutting assembly.

In various aspects, referring to FIG. 12, the journal bearing 108 can be a thrust bearing that fixedly couples to the shaft. That is, the journal bearing 108 can couple to the shaft 102, and an axial end surface 190 of the journal bearing can bias against an opposing surface 192 (e.g., a supporting surface) in an axial direction. Optionally, a split collar 128 can bias against the journal bearing 108 to compress the journal bearing against the shaft, thereby fixedly coupling the journal bearing to the shaft.

Although described herein as being used with tufting machines, it is contemplated that the disclosed bearing assemblies, including a journal bearing and a bearing race, can be used in other applications where it would be beneficial to provide stability to a shaft within a machine or apparatus that is exposed to significant reciprocal, oscillating movement during use. Such applications can include, but are not limited to, printers, manufacturing lines, or automotive applications.

EXEMPLARY ASPECTS

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A shaft assembly comprising: a shaft; a journal bearing that is fixedly coupled to the shaft so that rotation of the shaft causes corresponding rotation of the journal bearing; and a bearing race having an inner surface that defines a cylindrical bore and a lubrication groove that extends radially outward from the cylindrical bore, wherein the journal bearing is rotatably disposed within the cylindrical bore of the bearing race.

Aspect 2: The shaft assembly of aspect 1, wherein the journal bearing has opposing first and second ends, the shaft assembly further comprising a first split collar that is positioned on the first end of the journal bearing and a second split collar that is positioned on the second end of the journal bearing, wherein each of the first split collar and the second split collar applies a compressive force between the journal bearing and the shaft to fixedly couple the journal bearing to the shaft.

Aspect 3: The shaft assembly of aspect 1 or aspect 2, wherein the journal bearing has a length, wherein the journal bearing defines at least one longitudinally extending notch on the first end of the journal bearing that extends along a portion of the length of the bearing and at least one longitudinally extending notch on the second end of the journal bearing that extends along a portion of the length of the bearing.

Aspect 4: The shaft assembly of aspect 1 or aspect 2, wherein the journal bearing is a split bearing comprising a first portion and a second portion.

Aspect 5: The shaft assembly of aspect 4, wherein the journal bearing further comprises at least one fastener that extends between the first portion and the second portion.

Aspect 6: The shaft assembly of any one of aspects 2-5, further comprising a bearing race housing that defines a receiving space that is configured to receive at least a portion of the bearing race, wherein the bearing race is disposed within the receiving space, wherein the bearing race defines a flange on a first longitudinal end, and wherein the flange of the bearing race is disposed against the bearing race housing.

Aspect 7: The shaft assembly of any one of the preceding aspects, wherein the bearing race comprises a first portion and a second portion, wherein the first portion of the bearing race meets the second portion of the bearing race on opposing transverse sides of the shaft.

Aspect 8: The shaft assembly of aspect 8, wherein the bearing race is a split bearing race, wherein the first portion and second portion, when joined together on opposing transverse sides of the shaft, cooperate to define the cylindrical bore of the bearing race.

Aspect 9: The shaft assembly as in any one of the preceding aspects, further comprising a lubrication assembly in communication with the lubrication groove of the bearing race, wherein the lubrication assembly is configured to deliver lubricant to the lubrication groove.

Aspect 10: The shaft assembly as in any one of the preceding aspects, wherein the shaft has a first end and a second end and defines at least one planar surface on each of the first end and the second end, wherein the at least one planar surface on each of the first and second ends of the shaft is planar in the longitudinal dimension, the shaft assembly further comprising: first and second end bearings that each define an interior surface that has an interior bore defining a corresponding at least one planar surface to engage the respective end of the first and second end of the shaft; and first and second end bearing races that each receive a respective end bearing of the first and second end bearings.

Aspect 11: The shaft assembly of aspect 10, wherein the at least one planar surface on each of the first end and the second end of the shaft comprises four equally circumferentially spaced planar surfaces.

Aspect 12: The shaft assembly of aspect 10 or aspect 11, wherein the shaft assembly has defines male threads on each of the first end and the second end, the shaft assembly further comprising: a respective threaded locking collar coupled to the threads on each of the first end and the second end; a respective thrust bearing disposed between the respective locking collar and a respective end bearing race of the first and second end bearing races.

Aspect 13: A tufting apparatus comprising: a cutting assembly comprising at least one shaft; a frame that supports and receives therethrough each shaft of the at least one shaft; and at least one bearing assembly, each bearing assembly being disposed between the frame and a respective shaft of the at least one shaft, wherein each respective bearing assembly comprises: a journal bearing that is fixedly coupled to the respective shaft so that rotation of the shaft causes corresponding rotation of the journal bearing; and a bearing race having an inner surface that defines a cylindrical bore and a lubrication groove that extends radially outward from the cylindrical bore, wherein the journal bearing is rotatably disposed within the cylindrical bore of the bearing race.

Aspect 14: The tufting apparatus of aspect 13, wherein the at least one shaft comprises first, second, and third shafts, and wherein the at least one bearing assembly comprises first, second, and third bearing assemblies.

Aspect 15: The tufting apparatus of aspect 14, wherein the first shaft is a common pivot shaft, the second shaft is a knife drive shaft, and the third shaft is a looper drive shaft.

Aspect 16: The tufting apparatus of any one of aspects 13-15, wherein the journal bearing of at least one of the at least one bearing assembly has opposing first and second ends, the shaft assembly further comprising a first split collar that is positioned on the first end of the journal bearing and a second split collar that is positioned on the second end of the journal bearing, wherein each of the first split collar and the second split collar applies a compressive force between the journal bearing and the shaft to fixedly couple the journal bearing to the shaft.

Aspect 17: The tufting apparatus of any one of aspects 13-16, wherein the journal bearing of at least one of the at least one bearing assembly has a length, wherein the journal bearing defines at least one longitudinally extending notch on the first end of the journal bearing that extends along a portion of the length of the bearing and at least one longitudinally extending notch on the second end of the journal bearing that extends along a portion of the length of the bearing.

Aspect 18: The tufting apparatus of any one of aspects 13-17, wherein the journal bearing of at least one of the at least one bearing assembly is a split bearing comprising a first portion and a second portion.

Aspect 19: The tufting apparatus of aspect 18, wherein the journal bearing that is a split bearing further comprises at least one fastener that extends between the first portion and the second portion.

Aspect 20: The tufting apparatus of any one of aspects 13-19, wherein the bearing race of at least one bearing assembly comprises a first portion and a second portion, wherein the first portion of the bearing race meets the second portion of the bearing race on opposing transverse sides of the shaft.

Aspect 21: The tufting apparatus of aspect 20, wherein the bearing race that comprises a first portion and a second portion is a split bearing race, wherein the first portion and second portion, when joined together on opposing transverse sides of the shaft, cooperate to define the cylindrical bore of the bearing race.

Aspect 22: The tufting apparatus as in any one of aspects 13-21, further comprising a lubrication assembly in communication with the lubrication groove of the bearing race of the at least one bearing assembly, wherein the lubrication assembly is configured to deliver lubricant to the lubrication groove.

Aspect 23: A bearing assembly comprising: a journal bearing that is configured to be fixedly coupled to a shaft so that rotation of the shaft causes corresponding rotation of the journal bearing; and a bearing race having an inner surface that defines a cylindrical bore and a lubrication groove that extends radially outward from the cylindrical bore, wherein the journal bearing is rotatably disposed within the cylindrical bore of the bearing race.

Although the foregoing invention has been described in some detail by way of illustration and example for purposes of clarity of understanding, certain changes and modifications may be practiced within the scope of the appended claims. For example, it is contemplated that embodiments described herein can be advantageous in applications outside of tufting machines or textile manufacturing. For example, embodiments can be used in any suitable application of pivotal or rotational motion of one body relative to another, particularly in applications of oscillatory movement and/or in applications where removal and replacement of a bearing is desirable without removal of a shaft or other significant dismantling of an apparatus.

What is claimed is:

1. An assembly comprising:
a shaft;
a frame that supports and receives the shaft therethrough;
a journal bearing positioned on the shaft, the journal bearing having opposing first and second ends;
a first split collar that is positioned on the first end of the journal bearing and a second split collar that is positioned on the second end of the journal bearing, wherein the first and second split collars apply a compressive force to fixedly couple the shaft to the journal bearing; and
a bearing race having an inner surface that defines a cylindrical bore, wherein the journal bearing is rotatably disposed within the cylindrical bore of the bearing race, wherein at least a portion of the bearing race is positioned between the journal bearing and the frame, and wherein the journal bearing is positioned between the first and second split collars,
wherein the bearing race comprises a stop surface that is configured to bias against the frame to inhibit axial movement of the bearing race in a first direction, and
wherein the first split collar is configured to bias against the frame to inhibit axial movement of the first and second split collars, the journal bearing, and the shaft in a second direction opposite the first direction,
wherein the first and second split collars cooperate to retain the bearing race therebetween so that engagement between the frame and the first split collar inhibits axial movement of the second collar, and wherein axial contact between the bearing race and the second collar inhibits further movement of the bearing race relative to the frame in the second direction.

2. The assembly of claim 1, wherein the bearing race comprises a flange that defines the stop surface.

3. The assembly of claim 2, wherein the second split collar abuts the flange of the bearing race.

4. The assembly of claim 2, wherein the inner surface of the bearing race defines at least one lubrication groove that extends radially outward from the cylindrical bore.

5. The assembly of claim 4, wherein the at least one lubrication groove comprises a pair of intersecting grooves.

6. The assembly of claim 4, wherein the bearing race has a radially extending path that extends through the flange from an outer surface of the bearing race to the at least one lubrication groove defined by the inner surface.

7. The assembly of claim 4, further comprising a lubrication assembly in communication with the at least one lubrication groove of the bearing race, wherein the lubrication assembly is configured to deliver lubricant to the at least one lubrication groove.

8. The assembly of claim 1, wherein the journal bearing has a length, wherein the journal bearing defines at least one longitudinally extending notch on the first end of the journal bearing that extends along a portion of the length of the bearing and at least one longitudinally extending notch on the second end of the journal bearing that extends along a portion of the length of the journal bearing.

9. The assembly of claim 1, wherein the journal bearing is a split bearing comprising a first portion and a second portion.

10. The assembly of claim 9, wherein the journal bearing further comprises at least one fastener that extends between the first portion and the second portion.

11. The assembly of claim 1, wherein the bearing race comprises a first portion and a second portion, wherein the first portion of the bearing race meets the second portion of the bearing race on opposing transverse sides of the shaft.

12. The assembly of claim 11, wherein the bearing race is a split bearing race, wherein the first portion and the second portion, when joined together on opposing transverse sides of the shaft, cooperate to define the cylindrical bore of the bearing race.

13. The assembly of claim 1, wherein the shaft has first and second ends, wherein the assembly further comprises:
a first end bearing that engages the first end of the shaft so that the first end bearing rotates with the shaft;
a first end bearing race that receives the first end bearing;
a second end bearing that engages the second end of the shaft so that the first end bearing rotates with the shaft; and
a second end bearing race that receives the second end bearing.

14. The assembly of claim 13, wherein the assembly defines male threads on each of the first end and the second end, wherein the assembly further comprises:
a respective threaded locking collar coupled to the threads on each of the first end and the second end; and
a respective thrust bearing disposed between the respective locking collar and a respective end bearing race of the first and second end bearing races.

15. A tufting apparatus comprising:
a cutting assembly comprising at least one shaft;
a frame that supports and receives therethrough each shaft of the at least one shaft; and
at least one bearing assembly, each bearing assembly being disposed between the frame and a respective shaft of the at least one shaft, wherein each respective bearing assembly comprises:
a journal bearing positioned on the respective shaft, the journal bearing having opposing first and second ends;
a first split collar that is positioned on the first end of the journal bearing and a second split collar that is positioned on the second end of the journal bearing, wherein the first and second split collars apply a compressive force to fixedly couple the shaft to the journal bearing; and a bearing race having an inner surface that defines a cylindrical bore, wherein the journal bearing is rotatably disposed within the cylindrical bore of the bearing race, wherein at least a portion of the bearing race is positioned between the journal bearing and the frame, and wherein the journal bearing is positioned between the first and second split collars, wherein the bearing race comprises a stop surface that is configured to bias against the frame to inhibit axial movement of the bearing race in a first direction, and wherein the first split collar is configured to bias against the frame to inhibit axial movement of the first and second split collars, the journal bearing, and the shaft in a second direction opposite the first direction, wherein the first and second split collars cooperate to retain the bearing race therebetween so that engagement between the frame and the first split collar inhibits axial movement of the second collar, wherein axial contact between the bearing race and the second collar inhibits further movement of the bearing race relative to the frame in the second direction.

16. The tufting apparatus of claim 15, wherein the at least one shaft comprises first, second, and third shafts, and wherein the at least one bearing assembly comprises first, second, and third bearing assemblies.

17. The tufting apparatus of claim 16, wherein the first shaft is a common pivot shaft, the second shaft is a knife drive shaft, and the third shaft is a looper drive shaft.

18. The tufting apparatus of claim 15, wherein the journal bearing of at least one of the at least one bearing assembly has a length, wherein the journal bearing defines at least one longitudinally extending notch on the first end of the journal bearing that extends along a portion of the length of the bearing and at least one longitudinally extending notch on the second end of the journal bearing that extends along a portion of the length of the journal bearing.

19. The tufting apparatus of claim 15, wherein the journal bearing of at least one of the at least one bearing assembly is a split bearing comprising a first hollow half-cylindrical portion and a second hollow half-cylindrical portion.

20. The tufting apparatus of claim 19, wherein the journal bearing that is a split bearing further comprises at least one fastener that extends between the first hollow half-cylindrical portion and the second hollow half-cylindrical portion.

* * * * *